United States Patent
Shiga et al.

(10) Patent No.: US 7,991,952 B2
(45) Date of Patent: Aug. 2, 2011

(54) METHOD OF EXTENSION OF STORAGE CAPACITY AND STORAGE SYSTEM USING THE METHOD

(75) Inventors: Kenta Shiga, Yokohama (JP); Akira Nishimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 554 days.

(21) Appl. No.: 12/149,582

(22) Filed: May 5, 2008

(65) Prior Publication Data
US 2009/0240882 A1    Sep. 24, 2009

(30) Foreign Application Priority Data
Mar. 21, 2008 (JP) .................................. 2008-073605

(51) Int. Cl.
*G06F 12/06* (2006.01)
(52) U.S. Cl. .......... 711/114; 711/162; 711/165; 714/6.2
(58) Field of Classification Search .................. None
See application file for complete search history.

(56) References Cited

U.S. PATENT DOCUMENTS

| | | | |
|---|---|---|---|
| 5,809,224 A * | 9/1998 | Schultz et al. | 714/6.32 |
| 6,651,154 B1 * | 11/2003 | Burton et al. | 711/202 |
| 7,111,147 B1 * | 9/2006 | Strange et al. | 711/209 |
| 7,802,063 B1 * | 9/2010 | Chatterjee et al. | 711/156 |
| 2006/0248379 A1 * | 11/2006 | Jernigan | 714/6 |
| 2007/0192560 A1 * | 8/2007 | Furuhashi | 711/170 |
| 2008/0059752 A1 * | 3/2008 | Serizawa | 711/173 |

FOREIGN PATENT DOCUMENTS
JP  07-141121  11/1993
* cited by examiner

*Primary Examiner* — Kaushikkumar Patel
(74) *Attorney, Agent, or Firm* — Volpe and Koenig, P.C.

(57) ABSTRACT

Provided are a storage system and a method of controlling a storage system in which respective real storage areas of a plurality of disk drives contained in the storage system contain management units, and a control device of the storage system assigns a real storage area of a plurality of first disk drives to the virtual storage area, distributedly stores the data in the plurality of management units of the assigned real storage area, distributedly stores, upon receiving a request for adding a second disk drive, the data stored in the plurality of management units of the plurality of first disk drives in the plurality of management units of the plurality of first disk drives and the second disk drive, and assigns the real storage area of the plurality of first disk drives and the second disk drive to an unused virtual storage area.

8 Claims, 10 Drawing Sheets

RG TABLE

| RG ID | HDD ID LIST | RAID LEVEL | STATUS | ADDED HDD ID LIST |
|---|---|---|---|---|
| RG00 | H00, H01, H02, H03 | RAID5 | NORMAL | N/A |
| RG01 | H04, H05, H06, H07 | RAID5 | UNDER EXTENSION | H08 |
| ... | ... | ... | ... | ... |

*FIG. 5*

REAL LU TABLE

| REAL LU ID | RG ID | START STRIPE NO. | SIZE |
|---|---|---|---|
| R00 | RG00 | 0 | 450GB |
| R01 | RG00 | 2457600 | 450GB |
| R02 | RG01 | 0 | 900GB |
| ... | ... | ... | ... |
| ... | ... | ... | ... |

*FIG. 6*

POOL TABLE

| 701 POOL ID | 702 REAL LU ID | 703 ASSIGNED LAST PAGE NO. | 704 STATUS |
|---|---|---|---|
| P00 | R02 | 19200 | NORMAL |
| ... | ... | ... | ... |
| ... | ... | ... | ... |

TP LU TABLE

| 801 TP LU ID | 802 SIZE | 803 POOL ID |
|---|---|---|
| T00 | 240GB | P00 |
| T01 | 60GB | P00 |
| T02 | 60GB | P00 |
| ... | ... | ... |

MAPPING TABLE

| 901 TP LU ID | 902 TP PAGE NO. | 903 REAL LU ID | 904 REAL PAGE NO. |
|---|---|---|---|
| T00 | TP00 | R00 | RP00 |
| T00 | TP01 | R00 | RP01 |
| T00 | TP02 | null | null |
| ... | ... | ... | ... |

REAL LU TABLE

| REAL LU ID | RG ID | START STRIPE NO. | SIZE |
|---|---|---|---|
| R00 | RG00 | 0 | 450GB |
| R01 | RG00 | 2457600 | 450GB |
| R02 | RG01 | 0 | 600GB |
| R03 | RG01 | 3276800 | 400GB |
| ... | ... | ... | ... |

*FIG. 10*

POOL TABLE

| POOL ID | REAL LU ID | ASSIGNED LAST PAGE NO. | STATUS |
|---|---|---|---|
| P00 | R02 | 19200 | ASSIGNMENT NOT ALLOWED |
| P00 | R03 | N/A | NORMAL |
| ... | ... | ... | ... |

*FIG. 11*

METHOD OF EXTENSION OF STORAGE CAPACITY AND STORAGE SYSTEM USING THE METHOD

CLAIM OF PRIORITY

The present application claims priority from Japanese application JP2008-73605 filed on Mar. 21, 2008, the content of which is hereby incorporated by reference into this application.

BACKGROUND

A technology disclosed herein relates to management of a storage system, and more particularly, to an extension of a storage capacity of a storage system.

Conventionally, in order to securely store data used by companies and the like, storage systems configured into the redundant array of inexpensive disks (RAID) are widely used. The quantity of the data stored in these storage systems is explosively increasing, and it is thus necessary to extend the storage capacity of the storage system by adding disk drives. Generally, disk drives are added for respective RAID groups. For example, if the RAID level 5 that has a configuration of 3D (data)+1P (parity) is applied, four disk drives constitute one RAID group. In this case, in order to carry out an addition of disk drives once, at least four disk drives are necessary.

JP 07-141121 A discloses a technology for extending a storage capacity by extending a data width of a RAID group. According to this technology, when the RAID level 5 having the 3D+1P configuration is applied, by adding one disk drive to the RAID group, the configuration thereof is changed to 4D+1P. As a result, it is possible to add one disk drive at a time, and an extension of the storage capacity with the minimum necessary cost is thus realized.

SUMMARY

According to the technology described in JP 07-141121 A, in order to change the configuration of the RAID, it is necessary to relocate all data in the RAID group. As a result, until the relocation of the data is completed, it is not possible to use the extended storage capacity.

According to a representative invention disclosed in this application, there is provided a storage system comprising: a plurality of disk drives; and a control device for controlling the plurality of disk drives, the storage system being coupled to a host computer, wherein: the plurality of disk drives comprise a plurality of first disk drives and one second disk drive; the plurality of disk drives comprise a plurality of real storage areas; each of the plurality of real storage areas comprises a plurality of management units of a predetermine size; and the control device is configured to: hold information indicating correspondences between a plurality of virtual storage areas to be provided for the host computer and the plurality of real storage areas assigned to the plurality of virtual storage areas; assign, upon receiving a request for writing data to a virtual storage area to which a real storage area is not assigned, a real storage area, which is not assigned to a virtual storage area, of the plurality of real storage areas containing the plurality of management units of the plurality of first disk drives to the virtual storage area designated by the request for writing data; distributedly store the data requested to be written in the plurality of management units contained in the assigned real storage area; read, upon receiving a request for adding the second disk drive, the data stored in the plurality of management units of the plurality of first disk drives, and distributedly store the read data in the plurality of management units of the plurality of first disk drives and the second disk drive to relocate the data; and assign, upon receiving a request for writing data to a virtual storage area to which a real storage area is not assigned, after receiving the request for adding the second disk drive, and before the relocation of the data has been completed, a real storage area, which is not assigned to a virtual storage area, of the plurality of real storage areas containing the plurality of management units of the plurality of first disk drives and the second disk drive to the virtual storage area designated by the request for writing data.

According to an embodiment of this invention, it is possible to extend the storage capacity while a cost for adding disk drive is minimized. Moreover, according to the embodiment of this invention, it is possible to use an extended storage capacity immediately after the addition of the disk drive.

BRIEF DESCRIPTION OF THE DRAWINGS

FIG. 5 describes a RG table according to the embodiment of this invention.

FIG. 6 describes a real LU table according to the embodiment of this invention.

FIG. 7 describes a pool table according to the embodiment of this invention.

FIG. 8 describes a TP LU table according to the embodiment of this invention.

FIG. 9 describes a mapping table according to the embodiment of this invention.

FIG. 10 describes the changed real LU table according to the embodiment of this invention.

FIG. 11 describes the changed pool table according to the embodiment of this invention.

DETAILED DESCRIPTION OF THE PREFERRED EMBODIMENT

Hereinafter, a description will be given of an embodiment of this invention with reference to drawings.

Figure 1:
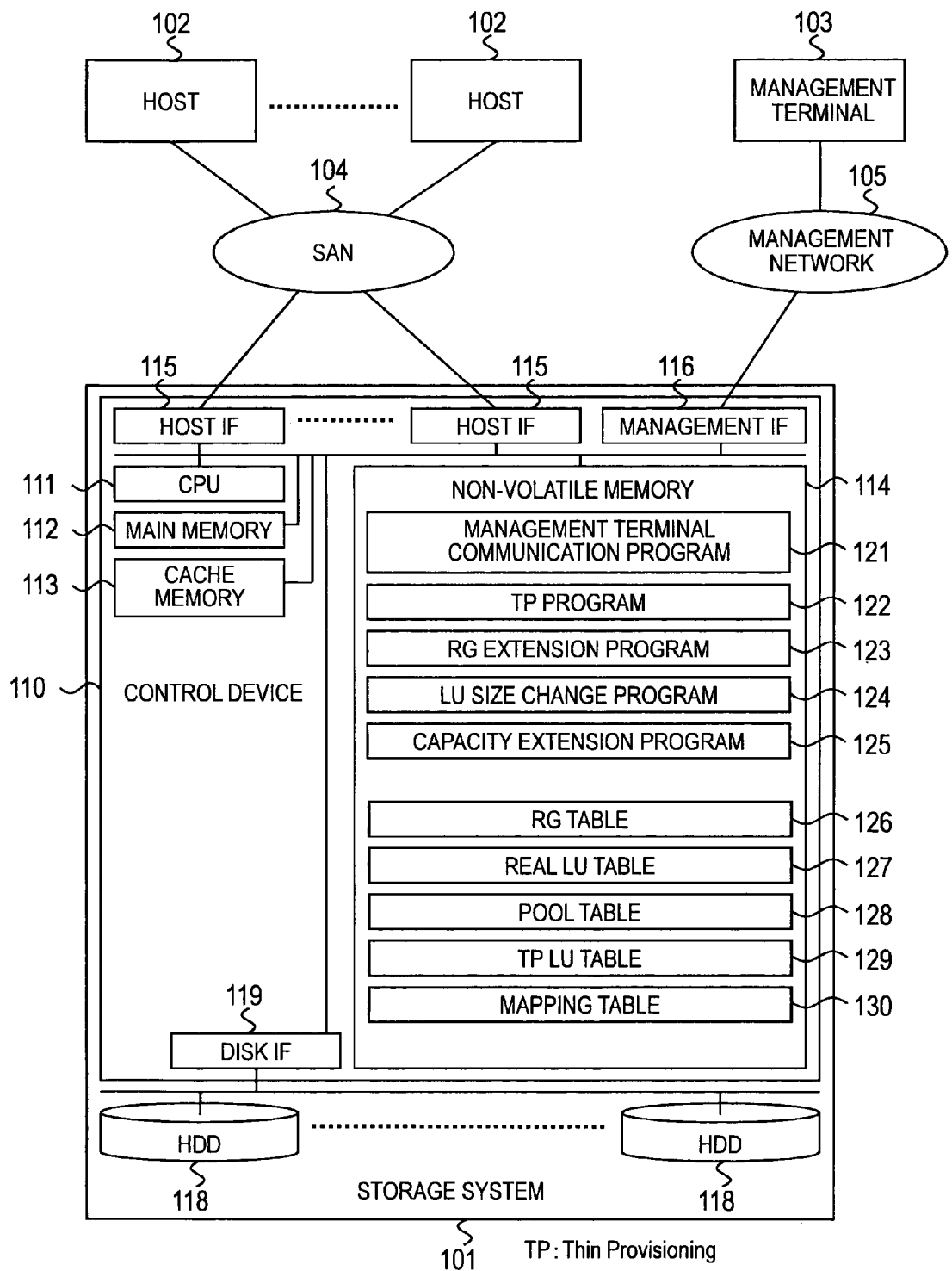
FIG. 1 is a block diagram showing a configuration of a computer system according to an embodiment of this invention.

FIG. 1 is a block diagram showing a configuration of a computer system according to the embodiment of this invention.

The computer system according to this embodiment includes a storage system 101, at least one host 102, and a management terminal 103. The at least one host 102 is coupled to the storage system 101 via a storage area network (SAN) 104. The management terminal 103 is coupled to the storage system 101 via a management network 105.

The storage system 101 includes a control device 110 and a plurality of hard disk drives (HDD's) 118.

The control device 110 includes a CPU 111, a main memory 112, a cache memory 113, a non-volatile memory 114, at least one host interface (IF) 115, at least one disk interface (IF) 119, and a management interface (IF) 116, which are coupled each other.

The CPU 111 is a processor for executing programs stored in the non-volatile memory 114. In the following description, processes executed by the programs stored in the non-volatile memory 114 are actually executed by the CPU 111.

The main memory 112 stores programs executed by the CPU 111, and data referred by the CPU 111. For example, a copy of at least a part of the programs and the like stored in the non-volatile memory 114 may be stored in the main memory 112 depending on necessity.

The cache memory 113 temporarily stores at least one of data to be written to the HDD's 118 and data read from the HDD's 118.

The main memory 112 and the cache memory 113 may be a semiconductor memory such as a dynamic random access memory (DRAM).

The non-volatile memory 114 stores programs executed by the CPU 111, and data referred by the CPU 111. The non-volatile memory 114 according to this embodiment stores at least a management terminal communication program 121, a thin provisioning (TP) program 122, a RAID group (RG) extension program 123, a logical volume (LU) size change program 124, a capacity extension program 125, a RG table 126, a real LU table 127, a pool table 128, a TP LU table 129, and a mapping table 130. A detailed description will later be given of these programs and tables. The non-volatile memory 114 may be a hard disk drive or a flash memory, for example.

The HDD's 118 store data written by the host 102. The HDD's 118 according to this embodiment constitute a RAID. When the control device 110 receives a request for writing data from the host 102, the control device 110 generates a parity based on requested data, and stores the data and the parity in the plurality of HDD's 118. The plurality of HDD's 118 storing data and parities generated based on the data constitute the RAID group.

The host IF 115 is coupled to the host 102 via the SAN 104, and communicates with the host 102 according to a predetermined protocol (such as the Fibre Channel protocol). The disk IF 119 is coupled to the HDD's 118, and communicates with the HDD's 118 according to a predetermined protocol (such as the Fibre Channel protocol).

The management IF 116 is coupled to the management terminal 103 via the management network 105, and communicates with the management terminal 103 according to a predetermined protocol.

The SAN 104 and the management network 105 may be any type of network. Typically, the SAN 104 may be a high-speed network applied to the Fiber Channel protocol and dedicated to an external storage device, and the management network 105 may be a so-called local area network (LAN).

The host 102 is a computer which transmits a request for writing data and a data read request to the storage system 101. The host 102 may include a CPU (not shown), a memory (not shown), and an interface (not shown), coupled with each other. The CPU executes an application program (not shown) stored in the memory, and transmits the request for writing data and the data read request via the interface depending on necessity, for example.

The management terminal 103 is a computer for managing the storage system 101.

Figure 2:
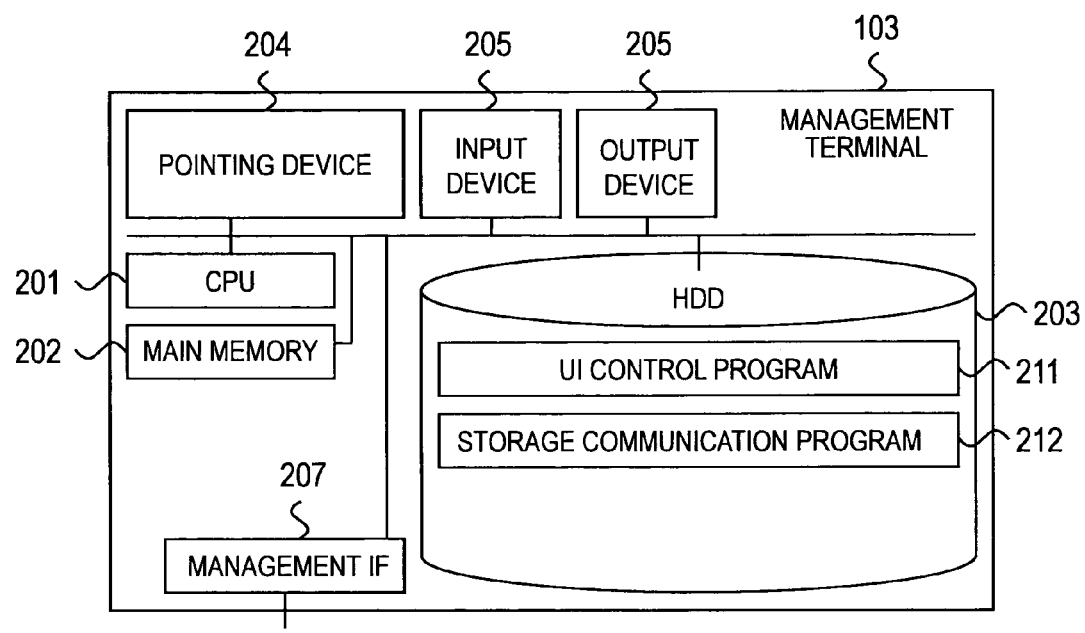
FIG. 2 is a block diagram showing a configuration of a management terminal according to the embodiment of this invention.

FIG. 2 is a block diagram showing a configuration of the management terminal 103 according to the embodiment of this invention.

The management terminal 103 according to this embodiment includes a CPU 201, a main memory 202, an HDD 203, a pointing device 204, an input device 205, an output device 206, and a management IF 207.

The CPU 201 is a processor for executing programs stored in the HDD 203.

The main memory 202 stores programs executed by the CPU 201, and data referred by the CPU 201. For example, a copy of at least a part of the programs stored in the HDD 203 may be stored in the main memory 202 depending on necessity.

The HDD 203 stores programs executed by the CPU 201. The HDD 203 according to this embodiment stores at least a user interface (UI) control program 211 and a storage communication program 212. The HDD 203 may be replaced by a non-volatile memory such as a flash memory.

The pointing device 204 is a mouse, for example, and the input device 205 is a keyboard, for example. The pointing device 204 and the input device 205 are used to receive an input from a user via a user interface.

The output device 206 is an image display device such as a liquid crystal screen. The output device 206 displays a screen for realizing a user interface described later.

The management IF 207 is coupled to the storage system 101 via the management network 105, and communicates with the storage system 101 according to a predetermined protocol.

FIGS. 3A to 3C and 4A to 4C describe an overview of steps of a capacity extension process carried out in the computer system according to the embodiment of this invention.

HDD's 118A to 118E in FIGS. 3A to 3C and 4A to 4C respectively correspond to any one of the plurality of HDD's 118. Illustrated "H04" to "H08" are respectively identifiers of the HDD's 118A to 118E. In the following description, the HDD's 118A to 118E are also respectively described as H04 to H08.

Figure 3:
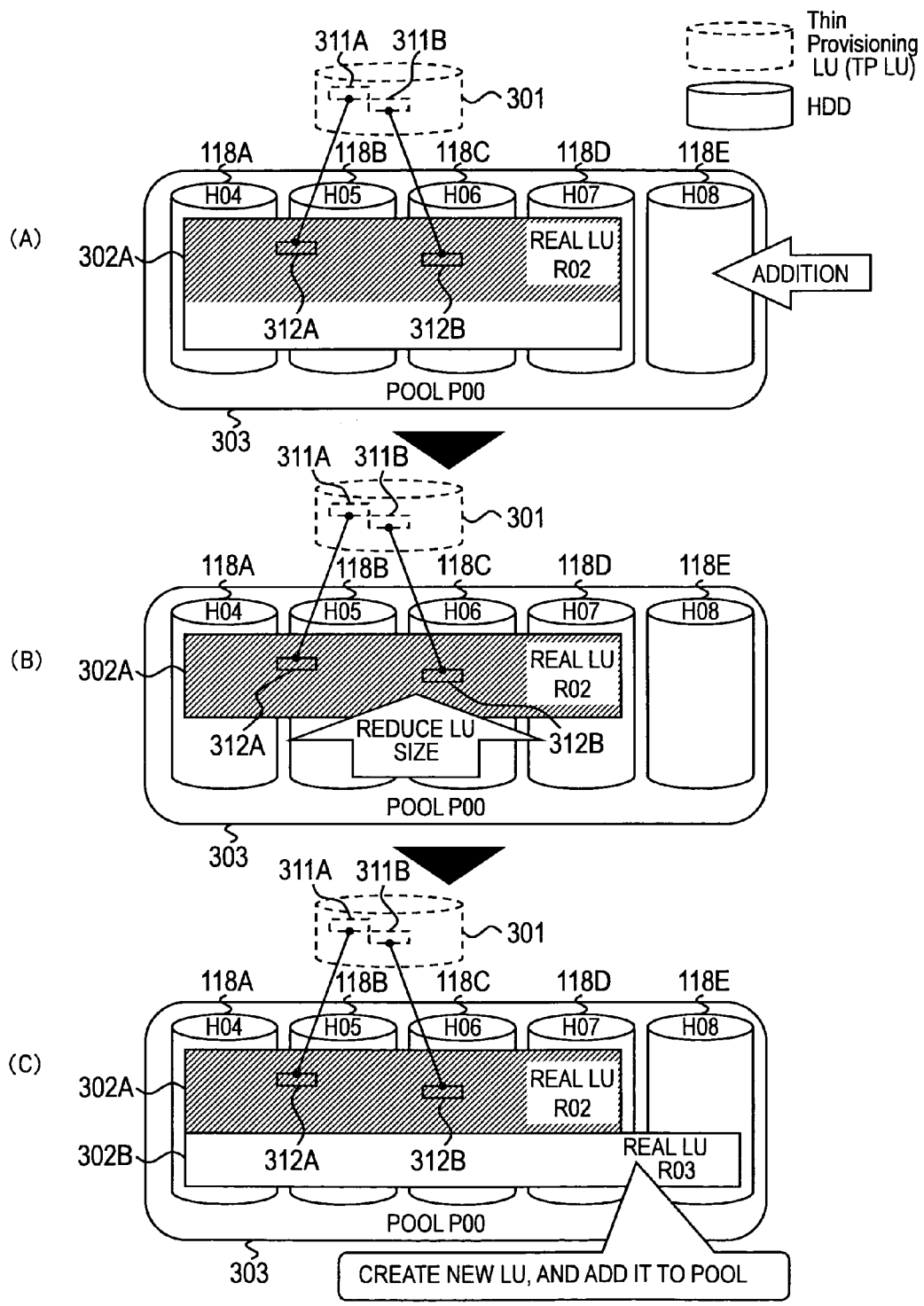
FIGS. 3A to 3C and 4A to 4C describe an overview of steps of a capacity extension process carried out in the computer system according to the embodiment of this invention.

FIG. 3A shows an example in which the RAID level 5 having the configuration of so-called 3D (data)+1P (parity) is applied. The HDD's 118A to 118D constitute one RAID group.

When the RAID level 5 is applied, data requested to be written is stored in a so-called stripe set across storage areas of the plurality of HDD's 118. Storage areas of the respective HDD's 118 constituting one stripe is also referred to as stripe unit. Each stripe unit is a management unit for the storage area having a predetermined size (such as 64 kilobytes (kB)).

For example, for the configuration of 3D+1P, respective stripes are set across the four HDD's 118 (such as HDD's 118A to 118D). In this case, one stripe contains four stripe units. These four stripe units are respectively contained in the HDD's 118A to 118D.

Data requested to be written is distributedly stored in the stripe units of the HDD's 118A to 118D. Specifically, the data is divided into the size of the stripe unit. Then, the three of the divided data are sequentially stored in three stripe units of one stripe. In the remaining one stripe unit, a parity generated from the data stored in the other three stripe units is stored. The rest of the data is sequentially stored in stripes in the same manner.

It should be noted that this embodiment shows an example in which the size of the stripe unit is 64 kB.

A real logical volume (LU) 302A is recognized as a logical storage system by the host 102. In FIG. 3A, the real LU 302A contains storage areas of the four HDD's 118H04 to H07. In other words, the real LU 302A contains at least one stripe set across the four HDD's 118 H04 to H07. Illustrated "R02" is an identifier of the real LU 302A. In the following description, the real LU 302A is also described as R02.

A thin provisioning LU (TP LU) 301 is a virtual logical volume provided by the TP program 122 for the host 102. When the TP LU 301 is created, the size, namely the storage capacity, thereof is defined, while storage areas of the HDD's 118 are not assigned to the TP LU 301. Then, when the TP program 122 receives a request for writing data to the TP LU 301 from the host 102, the TP program 122 assigns a storage area to store the requested data to the TP LU 301. On this occasion, the TP program 122 newly assigns a storage area, which has not been assigned to the TP LU 301, of the storage areas (namely, the real storage areas) of the real LU 302A to the TP LU 301. The requested data is stored in the storage area assigned to the TP LU 301.

The storage areas of the real LU 302A are respectively assigned to the TP LU 301 for storage areas of a predetermined size referred to as page. FIG. 3A shows an example in which a page 312A of the real LU 302A is assigned to a page 311A of the TP LU 301, and a page 312B of the real LU 302A is assigned to a page 311B of the TP LU 301. The pages 311A and 311B are virtual storage areas of the TP LU 301, and the pages 312A and 312B are real storage areas of the real LU 302A.

Each page contains at least one stripe. For example, when the size of a page is 32 megabytes (MB), and the size of the stripe unit is 64 kB, one page contains a plurality of stripes constructed of 512 stripe units. In this case, data stored in a page of a real LU assigned to the TP LU 301 is actually stored in at least one stripe contained in this page. In other words, data stored in the respective pages is distributedly stored in a plurality of stripe units contained in the plurality of HDD's (such as HDD's 118A to 118D).

In the example shown in FIG. 3A, a hatched portion of the real LU 302A indicates a storage area which has already been assigned to the TP LU 301.

A pool 303 is a group of at least one real LU 302 for providing storage areas to be assigned to the TP LU 301. In the example shown in FIG. 3A, the pool 303 contains only one real LU 302A. Illustrated "P00" is an identifier of the pool 303. In the following description, the pool 303 is also described as P00.

When the TP program 122 receives a request for writing data to a storage area of the TP LU 301 to which a storage area of a real LU 302 has not been assigned, the TP program 122 selects a page which has not been assigned to the TP LU 301 in the real LU 302A contained in the pool 303 corresponding to the TP LU 301, and newly assigns this page to the TP LU 301. The data requested to be written is stored in the assigned page of the real LU 302A.

According to this embodiment, while at least one real LU is defined as a pool, at least one RAID group may be defined as a pool.

As the size of the TP LU 301, a size larger than the size of the pool 303 corresponding thereto may be defined. Alternatively, a plurality of TP LU's may be assigned to one pool 303. In this case, the storage capacity of the pool 303 may become insufficient in the future. In order to solve the deficiency of the storage capacity, in the example shown in FIG. 3A, an HDD 118E is added. Specifically, for example, if a ratio of the pages which have already been assigned to the TP LU 301 to the pages contained in the pool 303 exceeds a predetermined threshold, the HDD 118E may be added.

When the HDD 118E is to be added, the LU size change program 124 reduces the size of the real LU 302A to the size of a storage area which has already been assigned to the TP LU 301, namely, the size of a hatched storage area as shown in FIG. 3B.

Then, the capacity extension program 125 generates a new real LU 302B, and adds the new real LU 302B to the pool 303 as shown in FIG. 3C. The real LU 302B contains free storage areas of the HDD's 118A to 118D generated by the size reduction in FIG. 3B, and a storage area of the HDD 118E corresponding to these free storage areas. These storage areas newly constitute the configuration of 4D+1P of the RAID level 5. On this occasion, an area which is not contained in the real LU 302B of the storage area of the added HDD 118E is a free area which does not store data nor parities of the real LU 302A.

Figure 4:
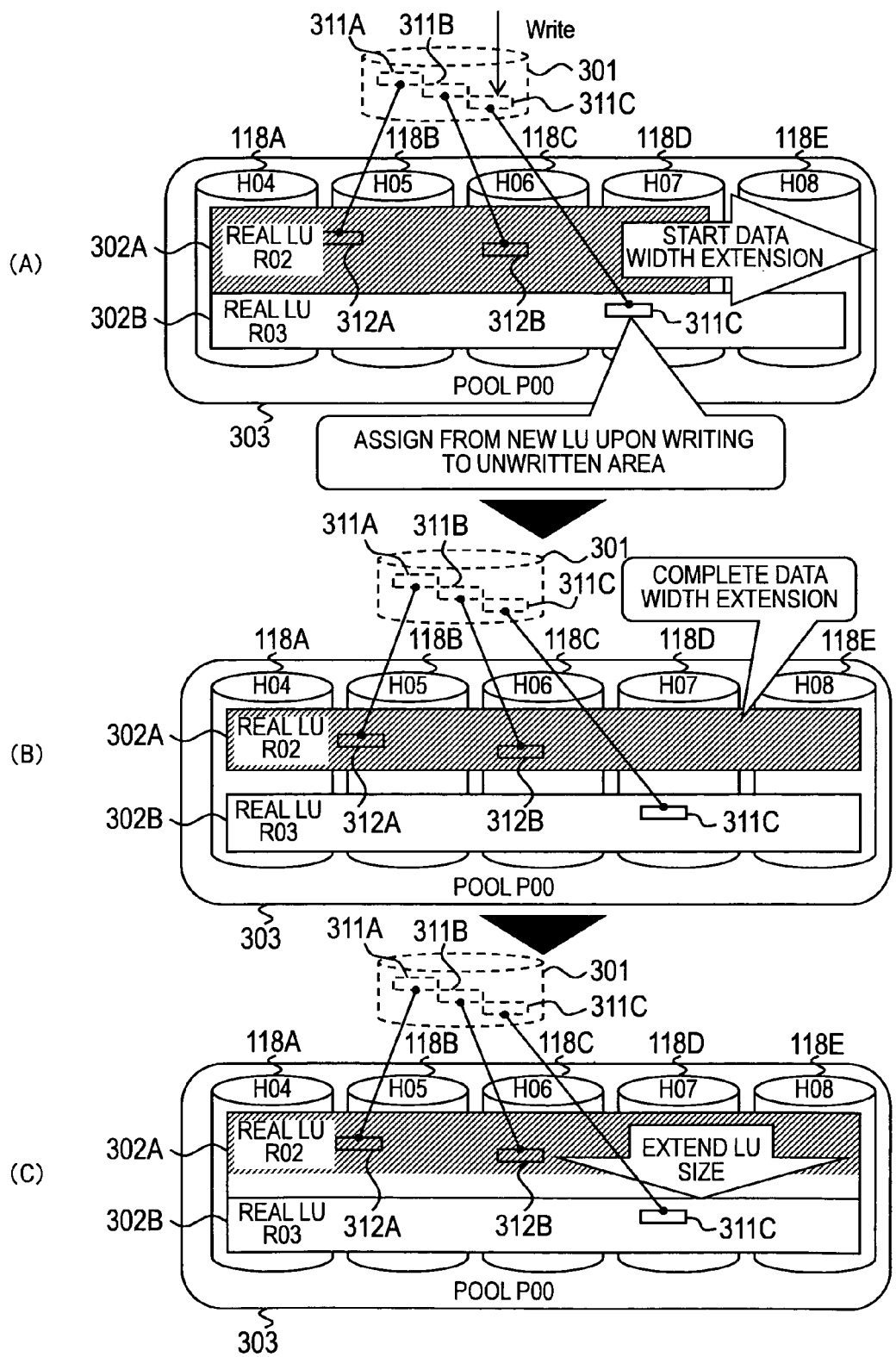

Then, the RG extension program 123 starts data width extension of the real LU 302A as shown in FIG. 4A. On this occasion, the data width extension is a process of extending the width of the stripe (namely, the number of stripe units constituting one stripe). In the example shown in FIG. 4A, the data width extension implies, in order to newly apply the configuration of 4D+1P to the real LU 302A to which the configuration of 3D+1P has been applied, a relocation of data read from the storage areas of the HDD's 118A to 118D corresponding to the real LU 302A to the HDD's 118A to 118E. This relocation may be realized by a well-known method such as a method described in JP 07-141121 A.

After the real LU 302B has been created, before the data width extension of the real LU 302A has been completed, if it is necessary to newly assign a page to the TP LU 301, a page of the real LU 302B is assigned to the TP LU 301. For example, if data is written to a storage area of a page 311C of the TP LU 301 to which a storage area of the real LU 302 has not been assigned, the TP program 122 newly assigns a page 312C in the real LU 302B to the page 311C.

As a result of the data width extension, data in the real LU 302A read from the HDD's 118A to 118D is distributedly stored in the HDD's 118A to 118E. Consequently, the free space of the HDD 118E at a time point shown in FIG. 3C reduces, and a free space (namely free stripes) corresponding to the reduced free space newly appears in the HDD's 118A to 118D as shown in FIG. 4B.

Then, the LU size change program 124 extends, by newly adding free stripes which are not contained in either of the real LU's 302 to the real LU 302A, the size of the real LU 302A as shown in FIG. 4C.

Hereinafter, a detailed description will be given of the steps in FIGS. 3A to 3C and 4A to 4C with reference to tables and flowcharts.

FIG. 5 describes the RG table 126 according to the embodiment of this invention.

The RG table 126 contains information indicating a configuration and a status of the respective RAID groups. Specifically, the RG table 126 includes RG ID's 501, HDD ID lists 502, RAID levels 503, statuses 504, and added HDD ID lists 505.

As the RG ID 501, the identifier of each RAID group created in the storage system 101 is registered.

As the HDD ID list 502, a list of identifiers of the HDD's 118 contained in each RAID group is registered.

As the RAID level 503, a RAID level applied to each RAID group is registered. For example, as the RAID level 503, "RAID 5" indicating the RAID level 5 is registered.

As the status 504, information indicating a status of each RAID group is registered. The information indicating the status of each RAID group includes "NORMAL" and "UNDER EXTENSION". "NORMAL" indicates that a RAID group is normally operating. (Namely, it is possible to write and read data to and from this RAID group.) "UNDER EXTENSION" indicates that the HDD 118 is added to the RAID group, and the capacity extension process shown in FIGS. 3A to 3C and 4A to 4C is being carried out.

As the added HDD ID list 505, a list of identifiers of the HDD's 118 newly added to each RAID group is registered.

In the example shown in FIG. 5, to the HDD ID list 502, the RAID level 503, the status 504, and the added HDD ID list 505 corresponding to a value "RG01" of the RG ID 501, "H04, H05, H06, H07", "RAID 5", "UNDER EXTENSION", and "H08" are respectively registered. This entry indicates that, as shown in FIG. 3A, the RAID level of the RAID group "RG 02" constituted by the HDD "H04" 118A to the HDD "H07" 118D is "5", the HDD "H08" 118E is newly added to the RAID group, and the capacity extension process is being carried out.

FIG. 6 describes the real LU table 127 according to the embodiment of this invention.

The real LU table 127 contains information indicating a configuration of the respective real LU's 302. Specifically, the real LU table 127 contains real LU ID's 601, RG ID's 602, start stripe numbers 603, and sizes 604.

As a real LU ID 601, the identifier of each real LU 302 is registered.

As an RG ID 602, the identifier of a RAID group containing each LU 302 is registered.

As a start stripe number 603, a number assigned to a stripe located at the beginning of a storage area assigned to each real LU 302 is registered.

As a size 604, the size of each real LU 302 (namely, the data storage capacity) is registered. When a RAID is constructed, as a size 604, a storage capacity of a storable user data (namely data except for parities) is registered.

In the example shown in FIG. 6, to an RG ID 602, a start stripe number 603, and a size 604 corresponding to a value "R02" of a real LU ID 601, "RG01", "0", and "900 GB" are respectively registered. This entry indicates that, as shown in FIG. 3A, the real LU "R02" 302A corresponds to a storage area of 900 gigabytes (GB) starting from a start stripe (namely, a stripe bearing a number "0") of the RAID group "RG01" as shown in FIG. 5.

It should be noted that FIG. 3A shows an example in which the storage capacity of the respective HDD's 118 is 300 GB. In this case, the total of the storage capacities of the four HDD's 118 is 1200 GB. However, for the configuration of 3D+1P, parities are stored in ¼ of the capacity, the capacity for data is 900 GB.

FIG. 7 describes the pool table 128 according to the embodiment of this invention.

The pool table 128 contains information indicating a status of the pools 303. Specifically, the pool table 128 contains pool ID's 701, real LU ID's 702, assigned last page numbers 703, and statuses 704.

As a pool ID 701, the identifier of each pool 303 is registered.

As a real LU ID 702, the identifier of a real LU 302 contained in each pool 303 is registered.

As an assigned last page number 703, the number of the last page which has been assigned to a TP LU of pages of a real LU 302 contained in each pool 303 is registered. It should be noted that, according to this embodiment, pages of a real LU 302 are assigned to a TP LU in the order of the assigned page number. Therefore, all pages, to which numbers before a number registered as the assigned last page number 703 have been assigned, have been assigned to the TP LU, and all pages, to which numbers after the number registered as the assigned last page number 703 have been assigned, have not yet been assigned to the TP LU.

As a status 704, information indicating a status of each real LU 302 is registered. The information indicating the status of each real LU 302 includes "NORMAL", and "ASSIGNMENT NOT ALLOWED". "NORMAL" indicates a status in which the real LU 302 is normally operating. In this status, a page in the real LU 302 can be newly assigned to a TP LU. "ASSIGNMENT NOT ALLOWED" indicates a status in which a page in the real LU 302 cannot be newly assigned to a TP LU.

In the example shown in FIG. 7, to a real LU ID 702, an assigned last page number 703, a status 704 corresponding to a value "P00" of a pool ID 701, "R02", "19200", and "NORMAL" are respectively registered. This entry indicates that, as shown in FIG. 3A, the pool "P00" 303 contains the real LU "R02" 302A, pages from the start page to the page 19200 of the real LU "R02" 302A have already been assigned to a TP LU 301 (in other words, page subsequent to the 19200 page have not been assigned to the TP LU 301 yet), and pages of the real LU "R02" 302A can be newly assigned to the TP LU 301.

It should be noted that this embodiment shows an example in which the size of the page size is 32 megabytes (MB). In this case, 19200 pages correspond to 600 GB. As shown in FIG. 6, the size of the real LU "R02" 302A is 900 GB. Therefore, the example shown in FIG. 7 shows that two thirds of the storage area of the real LU "R02" 302A has already been assigned to the TP LU 301, and the rest of one third has not been assigned.

FIG. 8 describes the TP LU table 129 according to the embodiment of this invention.

The TP LU table 129 contains information indicating a configuration of the respective TP LU's. Specifically, the TP LU table 129 contains TP LU ID's 801, sizes 802, and pool ID's 803.

As a TP LU ID 801, an identifier of each TP LU is registered.

As a size 802, a size defined for each TP LU (namely storage capacity) is registered.

As a pool ID 803, the identifier of a pool 303 corresponding to each TP LU is registered. A pool 303 corresponding to a TP LU implies a pool 303 which supplies the TP LU with pages which can be assigned to the TP LU.

In the example shown in FIG. 8, to a size 802 and a pool ID 803 corresponding to a value "T00" of a TP LU ID 801, "240 GB" and "P00" are respectively registered. This entry indicates that the storage capacity of a TP LU identified by "T00" (such as TP LU 301) is defied as 240 GB, and a pool "P00" 303 corresponds to this TP LU. In other words, in this case, a page (such as page 312A) of the pool "P00" 303 can be assigned to the TP LU 301.

Further, in the example shown in FIG. 8, as all pool ID's 803 corresponding to values "T00", "T01", and "T02" of TP LU ID's 801, "P00" is registered. This means that the pool "P00" 303 corresponds to respective three TP LU's identified by "T00", "T01", and "T02", in other words, respective pages of the pool "P00" 303 can be assigned to any one of the three TP LU's.

FIG. 9 describes the mapping table 130 according to the embodiment of this invention.

The mapping table 130 contains information indicating correspondences between a page of a TP LU and a page of a real LU 302 assigned thereto. Specifically, the mapping table 130 contains TP LU ID's 901, TP page numbers 902, real LU ID's 903, and real page numbers 904.

As a TP LU ID 901, an identifier of a TP LU is registered.

As a TP page number 902, a number of a page in a TP LU is registered.

As a real LU ID 903, the identifier of a real LU 302 is registered.

As a real page number 904, a number of a page in a real LU 302 is registered.

In an example shown in FIG. 9, to a TP LU ID 901, a TP page number 902, a real LU ID 903, and a real page number 904 of a top entry (namely row) of the mapping table 130, "T00", "TP00", "R00", and "RP00" are respectively registered. This entry indicates that, to the page to which the number "TP00" is assigned of the TP LU identified by "T00", the page to which the number "RP00" is assigned of the real LU 302 identified by "R00" is assigned.

When, to a page of the TP LU, a page of a real LU 302 has not been assigned yet, as the real LU ID 903 and the real page number 904 corresponding to this page, "null" is registered.

Some of values in the above-mentioned tables are changed as the process shown in FIGS. 3A to 3C and 4A to 4C progresses. A description will now be given of examples of changed tables with reference to FIGS. 10 and 11.

FIG. 10 describes the changed real LU table 127 according to the embodiment of this invention.

Specifically, the real LU table 127 shown in FIG. 10 is changed reflecting a fact that the size of the real LU 302A is reduced as shown in FIG. 3B, and the new real LU 302B is added as shown in FIG. 3C.

A description will now be given of points in which FIG. 10 is different from FIG. 6.

In the real LU table 127 shown in FIG. 10, the value of the size 604 corresponding to the value "R02" of the real LU ID 601 is changed to "600 GB". As shown in FIG. 7, at a time point shown in FIG. 3A, of the storage area of 900 GB of the real LU "R02" 302A, the storage area corresponding to 600 GB has been assigned to the TP LU 301. Therefore, in a step shown in FIG. 3B, the size of the real LU "R02" 302A is reduced to 600 GB. This reduction, as shown in FIG. 10, is carried out by changing the value of the size 604 from "900 GB" to "600 GB".

It should be noted that, as described before, the size of one stripe unit according to this embodiment is 64 kB. Therefore, in the case of the configuration of 3D+1P, the number of the stripes required for storing data of 600 GB and parities generated therefrom is 3276800.

Moreover, a new entry is added to the real LU table 127 shown in FIG. 10. As a real LU ID 601, an RG ID 602, a start stripe number 603, and a size 604 of the added entry, "R03", "RG01", "3276800", and "400 GB" are respectively registered. This entry corresponds to the real LU "R03" 302B newly added in FIG. 3C. This indicates that the real LU "R03" 302B corresponds to a storage area of 400 GB starting from a stripe of the RAID group "RG01" to which a number "3276800" is assigned (namely a 3276801st stripe) as shown in FIG. 5.

It should be noted that stripes starting from the 3276801st stripe are set across the five HDD's 118 including the added HDD 118E. As a result, these respective stripes contain five stripe units.

When the storage capacity of the respective HDD's 118 is 300 GB, and the size of the respective stripe units is 64 kB, the total number of the stripes set to the RAID group constituted by these HDD's 118 is 4915200. If the configuration of 4D+1P is applied to these stripes, the storage capacity of data from the 3276801st stripe to the last stripe is 400 GB.

FIG. 10 shows the real LU table 127 when the step shown in FIG. 3C has been completed, and then, in the step shown in FIG. 4C, the value of the size 604 corresponding to the real LU "R02" 302A is changed to "800 GB". This change will be described later with reference to FIG. 14.

FIG. 11 describes the changed pool table 128 according to the embodiment of this invention.

Specifically, the pool table 128 shown in FIG. 11 has been changed reflecting a fact that the new real LU 302B is added as shown in FIG. 3C, and a fact that an assignment from the real LU 302A is not allowed as shown in FIG. 4A Hereinafter, a description will be given of points in which FIG. 11 is different from FIG. 7.

In the pool table 128 shown in FIG. 11, the value of the status 704 corresponding to the value "R02" of the real LU ID 702 is changed to "ASSIGNMENT NOT ALLOWED". This indicates that, as described referring to FIG. 4A, an assignment of a page from the real LU "R02" 302A to the TP LU 301 is not allowed.

Moreover, a new entry is added to the pool table 128 shown in FIG. 11. As a pool ID 701, a real LU ID 702, an assigned last page number 703, and a status 704 of the added entry, "P00", "R03", "N/A", and "NORMAL" are respectively registered. This entry corresponds to the real LU "R03" 302B which is newly created in FIG. 3C. This indicates that the pool "P00" 303 contains the real LU "R03" 302B, any pages of the real LU "R03" 302B have not been assigned to the TP LU 301 yet, and the pages of the real LU "R03" 302B can be newly assigned to the TP LU 301.

Figure 12:
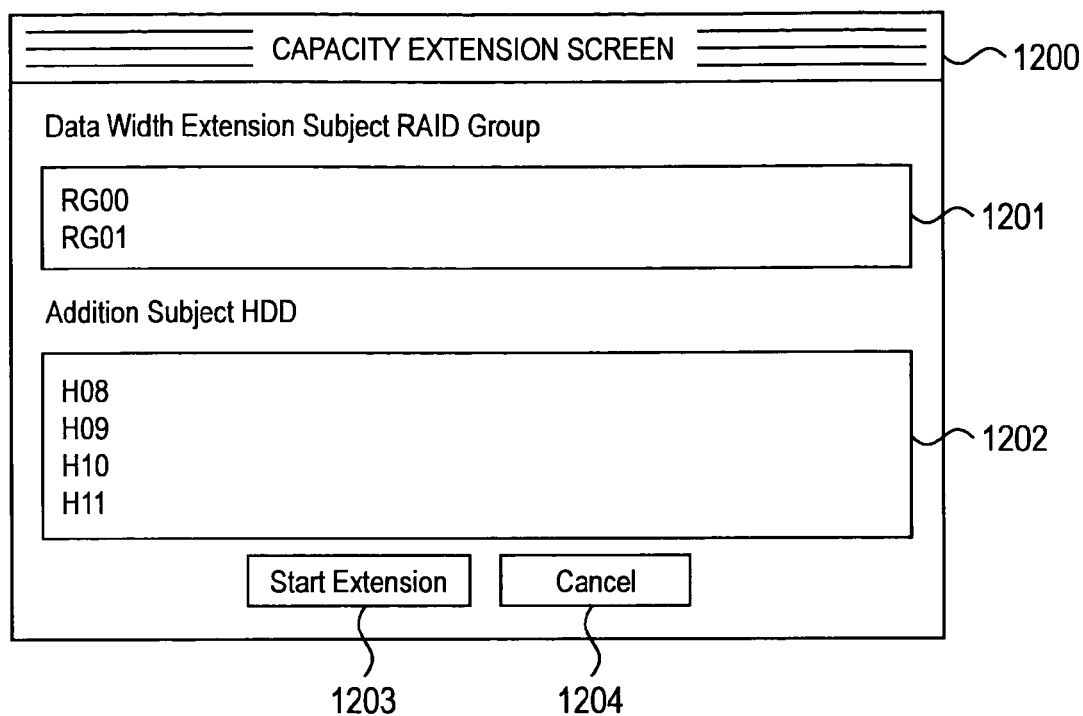
FIG. 12 describes a capacity extension screen according to the embodiment of this invention.

FIG. 12 describes a capacity extension screen according to the embodiment of this invention.

The capacity extension screen 1200 shown in FIG. 12 is displayed on the output device 206 of the management terminal 103 to provide a graphical user interface for the administrator. The administrator can instruct, by referring to and operating on the capacity extension screen 1200, the storage system 101 to execute the capacity extension process.

The capacity extension screen 1200 includes a data width extension subject RAID group display section 1201, an addition subject HDD display section 1202, an extension start button 1203, and a cancel button 1204.

The data width extension subject RAID group display section 1201 displays the identifiers of the RAID groups constructed in the storage system 101. The administrator can select, based on the displayed identifiers, an identifier of a RAID group to be extended.

The addition subject HDD display section 1202 displays identifiers of HDD's 118 which are not contained in any of the RAID groups, of the HDD's 118 provided for the storage system 101. The administrator can select, based on the displayed identifiers, an HDD 118 to be added to a RAID group for the capacity extension.

When the administrator selects the identifier of a RAID group to be extended, and an HDD 118 to be added, and then, operates the extension start button 1203, the capacity extension process starts, which is carried out by adding the selected HDD 118 to the selected RAID group.

For example, when the administrator selects "RG01" from the data width extension subject RAID group display section 1201, selects "H08" from the addition subject HDD display section 1202, and operates the extension start button 1203, an instruction to start the process to newly add the HDD "H08" 118E to the RAID group "RG01" containing the HDD "H04" 118A to the HDD "H07" 118D is transmitted from the management terminal 103 to the storage system 101. The storage system 101, according to the received instruction, starts the capacity extension process as shown in FIGS. 3A to 3C, 4A to 4C, 13, and 14.

On the other hand, when the administrator operates the cancel button 1204, the selections carried out in the data width extension subject RAID group display section 1201 and the addition subject HDD display section 1202 are cancelled.

It should be noted that the above-mentioned selections and button operations may be carried out by the administrator using the pointing device 204.

While FIG. 12 shows an example in which the administrator selects a RAID group the capacity of which is to be extended, the administrator may select a TP LU 301 or pool 303 the capacity of which is to be extended. In this case, the data width extension subject RAID group display section 1201 may display identifiers of TP LU's 301 or pools 303 which can be selected.

Figure 13:
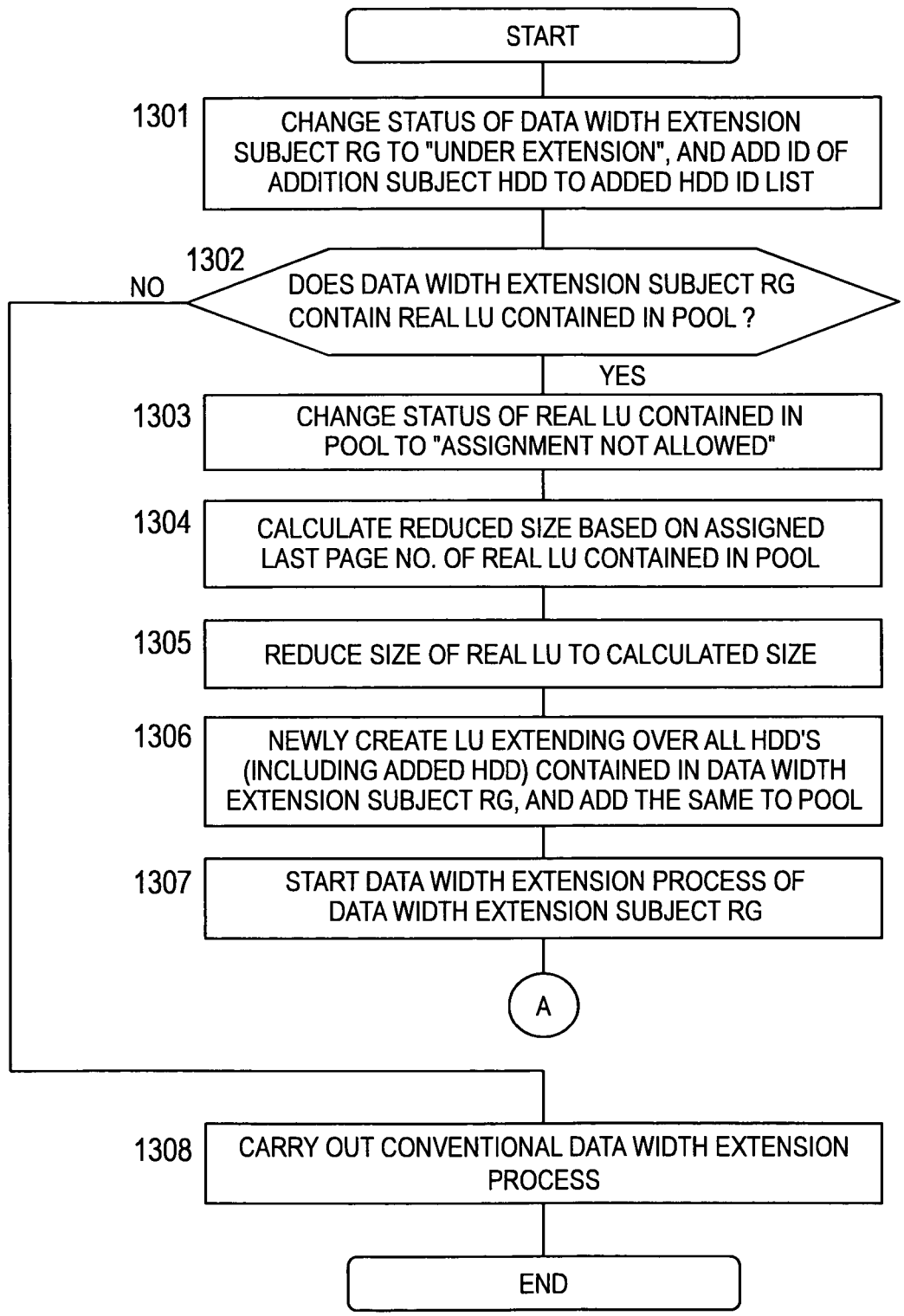
FIGS. 13 and 14 are flowcharts showing the capacity extension process carried out according to the embodiment of this invention.
Figure 14:
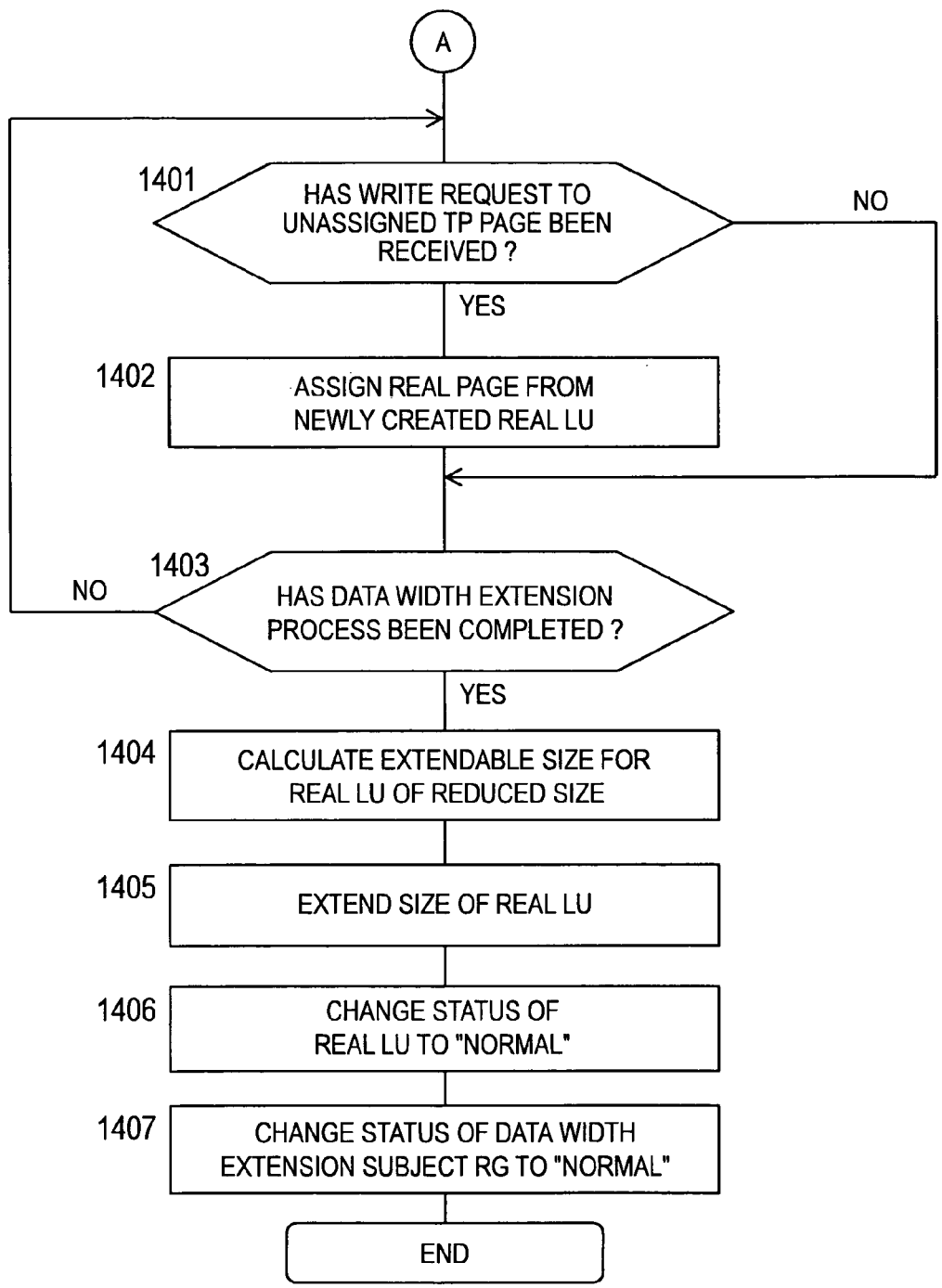

FIGS. 13 and 14 are flowcharts showing the capacity extension process carried out according to the embodiment of this invention.

As described with reference to FIG. 12, when the administrator selects the identifier of a RAID group to be extended and the identifier of an HDD 118 to be added, and instructs execution of the capacity extension process, the capacity extension process starts in the storage system 101. In the following description, the RAID group and the HDD 118 selected by the administrator are respectively referred to as RAID group of data width extension subject and addition subject HDD.

First, the capacity extension program 125 changes a value of a status 504 corresponding to a RAID group of data width extension subject in the RG table 126 to "UNDER EXTENSION", and adds the identifier of an addition subject HDD to an added HDD ID list 505 (step 1301). The status of the RAID group shown in FIG. 3A is a status at a time point immediately after the step 1301 has been executed.

Alternatively, when the administrator selects a TP LU 301 to be extended, the capacity extension program 125 refers to the TP LU table 129, the pool table 128, and the real LU table 127 to identify a RAID group which provides a storage area to be assigned to the selected TP LU 301 as a RAID group of data width extension subject. When the administrator selects a pool 303 to be extended, the capacity extension program 125 refers to the pool table 128 and the real LU table 127 to identify a RAID group to which a real LU 302 contained in the selected pool 303 is set as a RAID group of data width extension subject.

Then, the capacity extension program 125 determines whether the RAID group of data width extension subject contains a real LU 301 contained in the pool 303 (step 1302). Specifically, the capacity extension program 125 determines whether the identifier of at least one real LU 302 contained in the RAID group of data width extension subject is registered as a real LU ID 702 in the pool table 128.

If the capacity extension program 125 determines that the RAID group of data width extension subject does not contain a real LU 302 contained in the pool 303 in the step 1302, any storage area in the RAID group of data width extension subject is not to be assigned to a TP LU. In this case, because the processes from FIGS. 3A to 3C and 4A to 4C cannot be executed, a conventional data width extension process is carried out instead (step 1308). An example of the conventional data width extension process is described in JP 07-141121 A, for example. When the step 1308 has been carried out, the capacity extension process ends.

On the other hand, if the capacity extension program 125 determines that the RAID group of data width extension subject contains a real LU 302 contained in the pool 303 in the step 1302, the capacity extension program 125 changes the value of a status 704 in the pool table 128 corresponding to the real LU 302 contained in the pool 303 to "ASSIGNMENT NOT ALLOWED" (step 1303).

Then, the capacity extension program 125 refers to an assigned last page number 703 of the real LU 302 contained in the pool 303, and calculates a size of the reduced real LU 302 (more precisely, a size of the real LU 302, not yet reduced, after the reduction) (step 1304). Specifically, the total of the size of the all pages from the start page of the real LU 302 to a page registered to the assigned last page number 703 is calculated as the size of the reduced real LU 302.

Then, the LU size change program 124 reduces the size of the real LU 302 to the size calculated in the step 1304 (step 1305). The steps 1304 and 1305 correspond to the steps described with reference to FIGS. 3B and 10.

Then, the capacity extension program 125 newly creates a real LU 302 extending across all HDD's 118 contained in the RAID group of data width extension subject to add the created real LU to a pool (step 1306). This corresponds to the steps described with reference to FIGS. 3C, 10, and 11.

Then, the RG extension program 123 starts the data width extension process of the RAID group of data width extension subject (step 1307). This corresponds to the step described with reference to FIG. 4A.

For example, as shown in FIG. 3A, when one HDD 118 is added to the RAID group containing four HDD's 118, in the step 1307, the data width extension process starts for the real LU 302A in which the data has already stored. In this example, as a result of the addition of the HDD 118E, the number of the stripe units constituting one stripe increases from four to five. In this case, the data width extension process newly applies the configuration of 4D+1P to the real LU 302A, to which the configuration of 3D+1P has been applied.

Specifically, for example, the RG extension program 123 sequentially reads data stored in the stripe units from the beginning of the real LU 302A. Then, the RG extension program 123 newly calculates a parity based on the data of four sequentially read stripe units. Then, the RG extension program 123 overwrites the data and parity on one extended stripe. When the new calculation of the parity and the new relocation of data have been carried out for all the data in the real LU 302A, the data width extension process ends.

While, in the above specific example, the size of the real LU 302A is initially 900 GB, before the start of the data width extension process, the size is reduced to 600 GB corresponding to the data quantity which is actually stored. As a result, the number of stripes subject to the data width extension process is reduced, so time required for the data width extension process can thus be reduced.

After the data width extension process starts, the capacity extension program 125 determines whether the data width extension process has been completed or not (step 1403). The capacity extension program 125 continues the data width extension process until the capacity extension program 125 determines that the data width extension process has been completed.

While the data width extension process is being carried out, the capacity extension program 125 determines whether a request for writing data to a page, to which a page of a real LU 302 has not been assigned, of the pages of the TP LU 301 has been received (step 1401).

If the capacity extension program 125 determines that a request for writing data to a page, to which a page of a real LU 302 has not been assigned, has been received, the TP program 122 assigns a page of the real LU 302 newly created in the step 1306 to the TP LU 301 (step 1402). This corresponds to the step described with reference to FIG. 4A.

As described later, in the above-mentioned specific example, the capacity extension process extends the total storage capacity of the real LU 302A assigned to the TP LU 301 from 900 GB finally to 1200 GB. However, before the completion of the capacity extension process, the step 1402 can allow the assignment of a storage area of the newly created real LU 302B to the TP LU 301.

Immediately before the start of the capacity extension process, the capacity of the storage area of the real LU 302A which can be newly assigned to the TP LU 301 is 300 GB, which corresponds to a free capacity at that time point. On the other hand, when the capacity extension process has been completed, the capacity of the storage area of the real LU 302A which can be newly assigned to the TP LU 301 is extended to 600 GB, which is a sum of the above-mentioned 300 GB and the added 300 GB.

However, even before the capacity extension process has been completed, when the real LU 302B has been created in the step 1306, the capacity of the storage area of the real LU 302B which can be newly assigned to the TP LU 301 is 400 GB. In this way, according to this embodiment, immediately after the start of the capacity extension process (more precisely, after the completion of the creation of the real LU 302B in the step 1306 even before the completion of the data width extension process), a part of the added storage capacity becomes available.

When the data width extension process has been completed, the capacity extension program 125 calculates an extendable size of the real LU 302 reduced in the step 1305 (step 1404). The status of the RAID group after the data width extension process is completed as shown in FIG. 4B.

For example, in the case where data of 600 GB is stored in the real LU 302A, and where the size of the respective stripe units is 64 kB, when the data width extension process applies the configuration of 4D+1P, the 2,457,600 stripes from the beginning (namely stripes numbered from "0" to "2,457,599") store data and parities.

At this time point, the start stripe number of the new real LU "R03" 302B is 3,276,800. In other words, at this time point, stripes numbered from "2,457,600" to "3,276,799" constitute a free storage area. Therefore, the real LU 302A can be extended so that the stripe numbered "3,276,799" is at an end of the real LU 302A.

The data quantity which can be stored in the 3,276,800 stripes numbered from "0" to "3,276,799" is 800 GB. In other words, in the above-mentioned specific example, in the step 1404, as the extendable size, 800 GB is calculated.

Then, the LU size change program 124 extends the size of the real LU 302A to the size calculated in the step 1404 (step 1405). Specifically, the LU size change program 124 registers the size calculated in the step 1404 to the size 604 of the real LU table 127. For example, as described above, when 800 GB is calculated as the size of the real LU 302A, the LU size change program 124 changes the value of the size 604 corresponding to the real LU "R02" 302A to "800 GB".

As a result, the total of the size of the real LU's 302 assigned to the TP LU 301 is extended from 900 GB as shown in FIG. 6 to 1200 GB (namely 800 GB+400 GB).

The calculation of the size in the step 1404 and the extension of the size in the step 1405 correspond to the step described with reference to FIG. 4C.

Then, the capacity extension program 125 changes the value of the status 704 of the pool table 128, which has been changed to "ASSIGNMENT NOT ALLOWED" in the step 1303 to "NORMAL" (step 1406).

Then, the capacity extension program 125 changes the value of the status 504 of the RG table 126, which has been changed to "UNDER EXTENSION" in the step 1301 to "NORMAL" (step 1407). Further, the capacity extension program 125 adds the identifier of the HDD 118 registered to the added HDD ID list 505 corresponding to the extended RAID group to the HDD ID list 502, and changes the value of the added HDD ID list 505 to "N/A".

This is the end of the capacity extension process.

The capacity extension process described in FIGS. 13 and 14 can be started not only by the instruction of the administrator, but also by a determination of the control device 110 of the storage system 101. For example, if the control device 110 may recognize the ratio of pages which have already been assigned to the TP LU 301 of the pages contained in the pool 303, and this ratio exceeds a predetermined threshold, the control device 110 starts the capacity extension process by selecting an arbitrary HDD 118 from free HDD's 118. As a result, the HDD 118 selected by the control device 110 is added to the RAID group constituting the real LU's 302 of this pool 303.

According to the above-mentioned embodiment of this invention, as an example, the RAID group to which the RAID level 5 is applied is described. However, this invention is not limited to the above-mentioned embodiment, and can be applied to a plurality of HDD's 118 to which the striping is applied. For example, this invention can be applied to the RAID level 0, namely the striping without redundancy for high-speed access. When this invention is applied to the RAID level 0, in the data width extension process, the relocation of data is carried out while parities are not calculated.

According to the embodiment of this invention, even if striping is applied across a plurality of HDD's, it is possible to add HDD's one by one. As a result, it is possible to extend the storage capacity of a storage system with the minimum necessary cost. Moreover, the relocation of data (and recalculation of parities) is carried out only for data stored in real storage areas assigned to a TP LU. As a result, it is possible to reduce time required for the extension of the storage capacity. Further, before the relocation of the data is carried out, a real LU containing a storage area of the added HDD is newly created. Thus, even before the completion of the relocation of the data, it is possible to assign a storage area of the newly created real LU to a virtual LU (namely, a TP LU). Therefore, it is possible to use at least a part of the added storage area immediately after the addition of the HDD.

While the present invention has been described in detail and pictorially in the accompanying drawings, the present invention is not limited to such detail but covers various obvious modifications and equivalent arrangements, which fall within the purview of the appended claims.

What is claimed is:

1. A storage system comprising:
a plurality of disk drives; and
a control device controlling the plurality of disk drives,
the storage system is coupled to a host computer, wherein:
the plurality of disk drives comprise a plurality of first disk drives and one second disk drive;
the plurality of disk drives comprise a plurality of real storage areas, wherein the plurality of real storage areas of the plurality of first disk drives constitutes a first logical volume prior to the control device receiving a request for adding the second disk drive,
each of the plurality of real storage areas comprises a plurality of management units of a predetermine size; and
the control device is configured to:
hold information indicating correspondences between a plurality of virtual storage areas to be provided for the host computer and the plurality of real storage areas assigned to the plurality of virtual storage areas;
receive a request for writing data to a first virtual storage area to which a real storage area is not assigned, assign a first real storage area, which is not assigned to a virtual storage area, of the plurality of real storage areas of the plurality of first disk drives, to the first virtual storage area;

distributedly store the data requested to be written in the plurality of management units contained in the first real storage area;

change a size of the first logical volume so as to contain only the plurality of real storage areas assigned to the plurality of virtual storage areas, in response to receiving the request for adding the second disk drive;

create a second logical volume comprising the plurality of real storage areas containing a part of the plurality of management units of the second disk drive, and the plurality of management units that are not contained in the first logical volume and are of the plurality of first disk drives;

read the data stored in the plurality of management units of the plurality of first disk drives in response to receiving the request for adding the second disk drive, and distributedly store the read data in the plurality of management units of the plurality of first disk drives and the second disk drive to relocate the read data only for the plurality of management units contained in the first logical volume;

receive a request for writing data to a second virtual storage area to which a real storage area is not assigned, after receiving the request for adding the second disk drive, and before the relocation of the data has been completed, assign a second real storage area, which is located in the second logical volume and not assigned to a virtual storage area, to the second virtual storage area; and wherein the control device is further configured to change, after having completed the relocation of the data, a size of the first logical volume so that the plurality of real storage areas which are not contained in both the first logical volume and the second logical volume are newly contained in the first logical volume.

2. The storage system according to claim 1, wherein:

the control device is further configured to hold pool information for identifying a pool containing the plurality of real storage areas which can be assigned to the plurality of virtual storage areas;

the request for adding the second disk drive comprises information indicating that the second disk drive is to be added to the pool; and the control device is further configured to carry out, upon determining based on the pool information that the pool designated by the request contains the plurality of real storage areas containing the plurality of management units of the plurality of first disk drives, the relocation of the data for the plurality of management units of the plurality of first disk drives.

3. The storage system according to claim 1, wherein:

the control device is further configured to hold pool information for identifying a pool containing the plurality of real storage areas which can be assigned to the plurality of virtual storage areas;

the request for adding the second disk drive comprises information indicating that the second disk drive is to be added to a virtual logical volume containing the plurality of virtual storage areas; and the control device is further configured to carry out, upon determining based on the pool information that each of the plurality of real storage areas which can be assigned to the plurality of virtual storage areas contained in the virtual logical volume designated by the request contains each of the plurality of real storage areas containing the plurality of management units of the plurality of first disk drives, the relocation of the data for the plurality of management units of the plurality of first disk drives.

4. The storage system according to claim 1, wherein the control device is configured to:

hold pool information for identifying a pool containing the plurality of real storage areas which can be assigned to the plurality of virtual storage areas; and inhibit creating, upon determining based on the pool information that the plurality of real storage areas contained in the first logical volume cannot be assigned to the plurality of virtual storage areas, the second logical volume.

5. A method of controlling a storage system including a plurality of disk drives, and a control device for controlling the plurality of disk drives, the storage system is coupled to a host computer, the plurality of disk drives including a plurality of first disk drives and one second disk drive, the plurality of disk drives including a plurality of real storage areas, wherein the plurality of real storage areas of the plurality of first disk drives constitutes a first logical volume prior to the control device receiving a request for adding the second disk drive, each of the plurality of real storage areas including a plurality of management units of a predetermine size, the control device holding information indicating correspondences between a plurality of virtual storage areas to be provided for the host computer and the plurality of real storage areas assigned to the plurality of virtual storage areas, the method comprising:

a first step of receiving a request for writing data to a first virtual storage area to which a real storage area is not assigned, and in response to the received request, assigning a first real storage area, which is not assigned to a virtual storage area, of the plurality of real storage areas of the plurality of first disk drives, to the first virtual storage area;

a second step of distributedly storing the data requested to be written in the plurality of management units contained in the first real storage area;

a third step of changing a size of the first logical volume so as to contain only the plurality of real storage areas assigned to the plurality of virtual storage areas, in response to receiving the request for adding the second disk drive;

a fourth step of creating a second logical volume after the size of the first logical volume has been changed, the second logical volume comprising the plurality of real storage areas containing a part of the plurality of management units of the second disk drive, and the plurality of management units that are not contained in the first logical volume and are of the plurality of first disk drives;

a fifth step of reading, the data stored by the plurality of management units of the plurality of first disk drives in response to receiving a request for adding the second disk drive, and distributedly storing the read data in the plurality of management units of the plurality of first disk drives and the second disk drive to relocate the read data only for the plurality of management units contained in the first logical volume;

a sixth step of receiving a request for writing data to a second virtual storage area, to which a real storage area is not assigned, after receiving the request for adding the second disk drive, and before the relocation of the data has been completed, and assigning a second real storage area, which is located in the second logical volume and not assigned to a virtual storage area, to the second virtual storage area; and a seventh step of changing, after having completed the relocation of the data, a size of the first logical volume so that the plurality of real storage areas which are not contained in both the first logical volume and the second logical volume are newly contained in the first logical volume.

6. The method according to claim 5, wherein:

the control device holds pool information for identifying a pool containing the plurality of real storage areas which can be assigned to the plurality of virtual storage areas;

the request for adding the second disk drive comprises information indicating that the second disk drive is to be added to the pool; and the fifth step is carried out upon determining based on the pool information that the pool designated by the request contains the plurality of real storage areas containing the plurality of management units of the plurality of first disk drives.

7. The method according to claim 5, wherein:

the control device holds pool information for identifying a pool containing the plurality of real storage areas which can be assigned to the plurality of virtual storage areas;

the request for adding the second disk drive comprises information indicating that the second disk drive is to be added to a virtual logical volume containing the plurality of virtual storage areas; and the fifth step is carried out upon determining based on the pool information that each of the plurality of real storage areas which can be assigned to the plurality of virtual storage areas contained in the virtual logical volume designated by the request contains each of the plurality of real storage areas containing the plurality of management units of the plurality of first disk drives.

8. The method according to claim 5, wherein: the control device holds information for identifying a pool containing the plurality of real storage areas which can be assigned to the plurality of virtual storage areas; and the fourth step is not carried out upon determining based on the pool information that the plurality of real storage areas contained in the first logical volume cannot be assigned to the plurality of virtual storage area.

* * * * *